United States Patent [19]
Chuang

[11] Patent Number: 5,649,657
[45] Date of Patent: Jul. 22, 1997

[54] ARTICLE CARRIER ASSEMBLY FOR CYCLES

[76] Inventor: Louis Chuang, 7th-8, No. 20, Da Long Road, Taichung, Taiwan

[21] Appl. No.: 688,637

[22] Filed: Jul. 29, 1996

[51] Int. Cl.$^6$ ...................................................... B62J 9/00
[52] U.S. Cl. ........................................... 224/430; 224/459
[58] Field of Search ................................... 224/459, 430, 224/431, 451, 452, 453, 454, 547, 564, 32 A; 280/202

[56] References Cited

U.S. PATENT DOCUMENTS

| | | | |
|---|---|---|---|
| 3,616,977 | 11/1971 | Zurmuhlen | 224/452 X |
| 3,921,868 | 11/1975 | Reichbach | 224/454 |
| 4,301,952 | 11/1981 | McNeill | 224/430 X |
| 4,418,850 | 12/1983 | Jackson et al. | 224/452 X |
| 4,562,944 | 1/1986 | Jackson et al. | 224/454 |
| 5,435,471 | 7/1995 | Chuang | 224/419 |
| 5,579,971 | 12/1996 | Chuang | 224/430 |

*Primary Examiner*—Renee S. Luebke
*Attorney, Agent, or Firm*—Charles E. Baxley, Esq.

[57] ABSTRACT

An article carrier assembly for attaching a bag to a cycle includes a rack having a front rod and having a dovetail slot. A beam is secured to the bag and includes a dovetail cross section for sliding engagement in the dovetail slot of the rack. The beam includes a block extended upward from the front portion and includes a vertical channel for slidably receiving a button. A hook is secured to the button and moved in concert with the button. A spring may bias the button upward and may bias the hook to engage with the front rod so as to secure the bag to the rack. A bar is engaged in the bag and secured to the beam for securing the beam and the bar to the bag such that the bag may be easily secured to the rack.

5 Claims, 6 Drawing Sheets

ARTICLE CARRIER ASSEMBLY FOR CYCLES

BACKGROUND OF THE INVENTION

1. Field of the Invention

The present invention relates to an article carrier, and more particularly to an article carrier assembly for cycles.

2. Description of the Prior Art

Typical carrier racks for bycicles may not be easily used for attaching bags or panniers thereto such that the bags or panniers are required to be designed and attached by a separate securing mechanism thereto for attaching the bags or panniers onto the carrier rack. The carrier rack comprises no attaching mechanism for attaching the bags or panniers to the carrier rack. One type of the securing mechanism for attaching the bag or pannier onto the article carrier is disclosed in the applicant's closest prior U.S. Pat. No. 5,438,471. The bags or panniers also may not be easily secured onto the typical carrier racks.

The present invention has arisen to mitigate and/or obviate the afore-described disadvantages of the conventional carrier racks.

SUMMARY OF THE INVENTION

The primary objective of the present invention is to provide an article carrier assembly which includes a mechanism for allowing the bag or pannier to be easily attached onto the carrier rack.

In accordance with one aspect of the invention, there is provided an article carrier assembly for attaching a bag to a cycle, the article carrier assembly comprises a rack body including a front rod and including a dovetail slot formed therein, a beam for securing to the bag, the beam including a dovetail cross section for sliding engagement in the dovetail slot of the rack body, the beam including a front portion having a block extended upward therefrom, the block including a hook provided therein for engaging with the front rod of the rack body so as to be secured to the rack body, a bar for engaging in the bag and for engaging on the beam, and means for securing the beam to the bar and for securing the bar and the beam to the bag.

The rack body includes a platform secured on top thereof, the dovetail slot is formed in the platform, the platform includes a wave shaped upper portion for reinforcing purposes.

The block includes a vertical channel formed therein, the article carrier assembly further includes a button slidably engaged in the vertical channel, the hook is secured to the button and moved in concert with the button, and means for biasing the button upward and for biasing the hook to engage with the front rod so as to secure the bag to the rack body.

A tube is further provided for securing to the cycle, the rack body being secured on the tube, the tube including a hollow interior, and a tool assembly for engaging in the hollow interior of the tube.

A sleeve is further provided for securing to the cycle, the sleeve including a lateral pin and including a first ear extended therefrom, a bracket secured to the tube and including a second hook for engaging with the lateral pin and including a second ear for aligning with the first ear of the sleeve, and means for securing the first and the second ears together so as to secure the bracket to the sleeve and so as to secure the tube to the sleeve.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
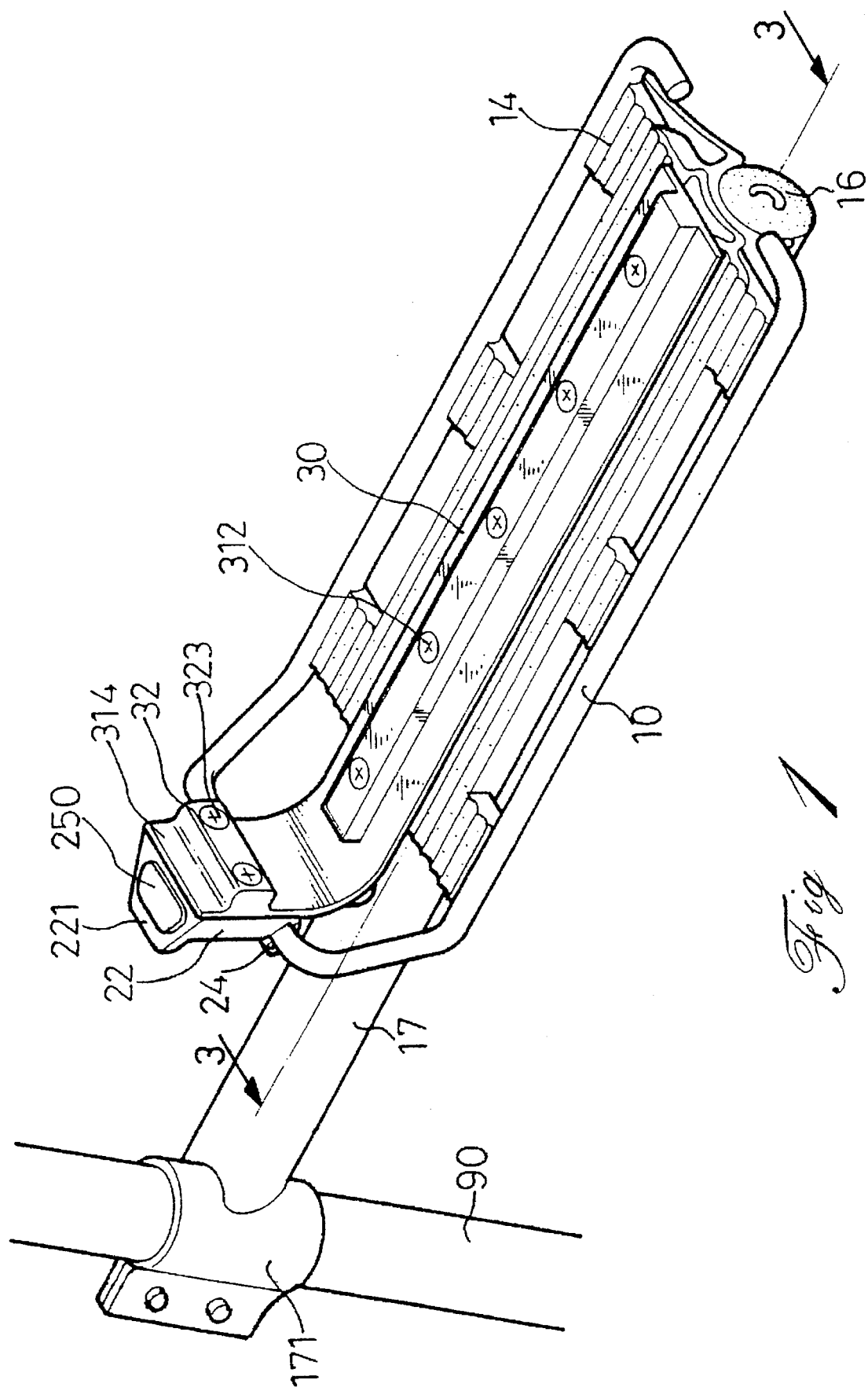
FIG. 1 is a perspective view of an article carrier assembly in accordance with the present invention.
Figure 2:
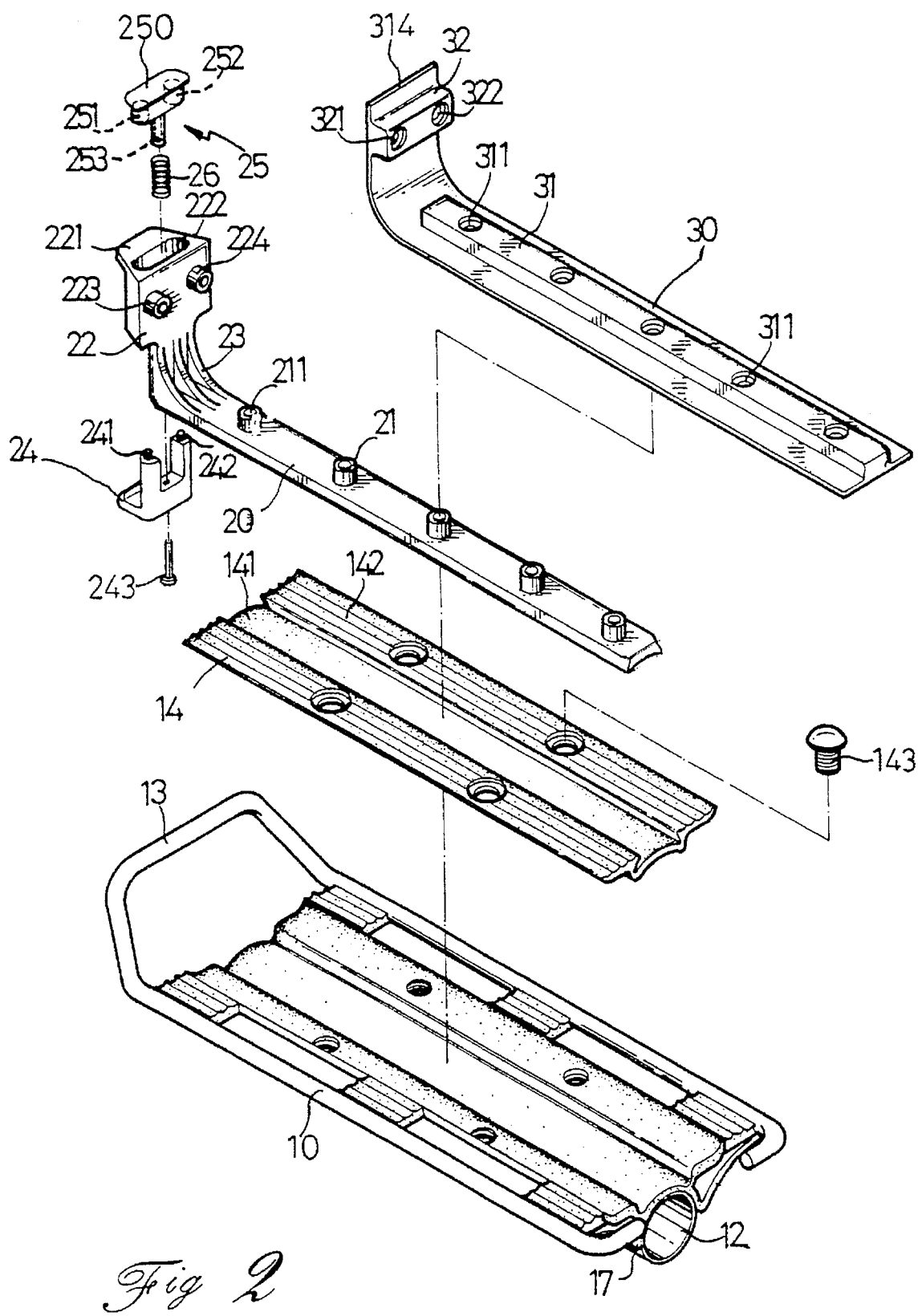
FIG. 2 is an exploded view of the article carrier assembly.

Referring to the drawings, and initially to FIGS. 1 to 4, an article carrier assembly in accordance with the present invention comprises a rack body 10 engaged with and secured on a tube 17 by such as welding process. The tube 17 includes a hollow interior 12 (FIGS. 2, 4) for receiving a tool assembly 15 (FIG. 5) therein and includes a sleeve 171 secured to the front end thereof for securing to the seat post 90 of the bicycle. The rack body 10 includes a front rod 13 provided on the front portion thereof. A platform 14 is secured on top of the rack body 10 by fastening screws 143 and includes a longitudinal dovetail slot 141 formed in the upper portion and includes a wave shaped upper surface 142 for reinforcing purposes. The present invention is to provide a mechanism for easily attaching a bag or a pannier 60 (FIGS. 3 and 4) onto the rack body 10.

Figure 3:
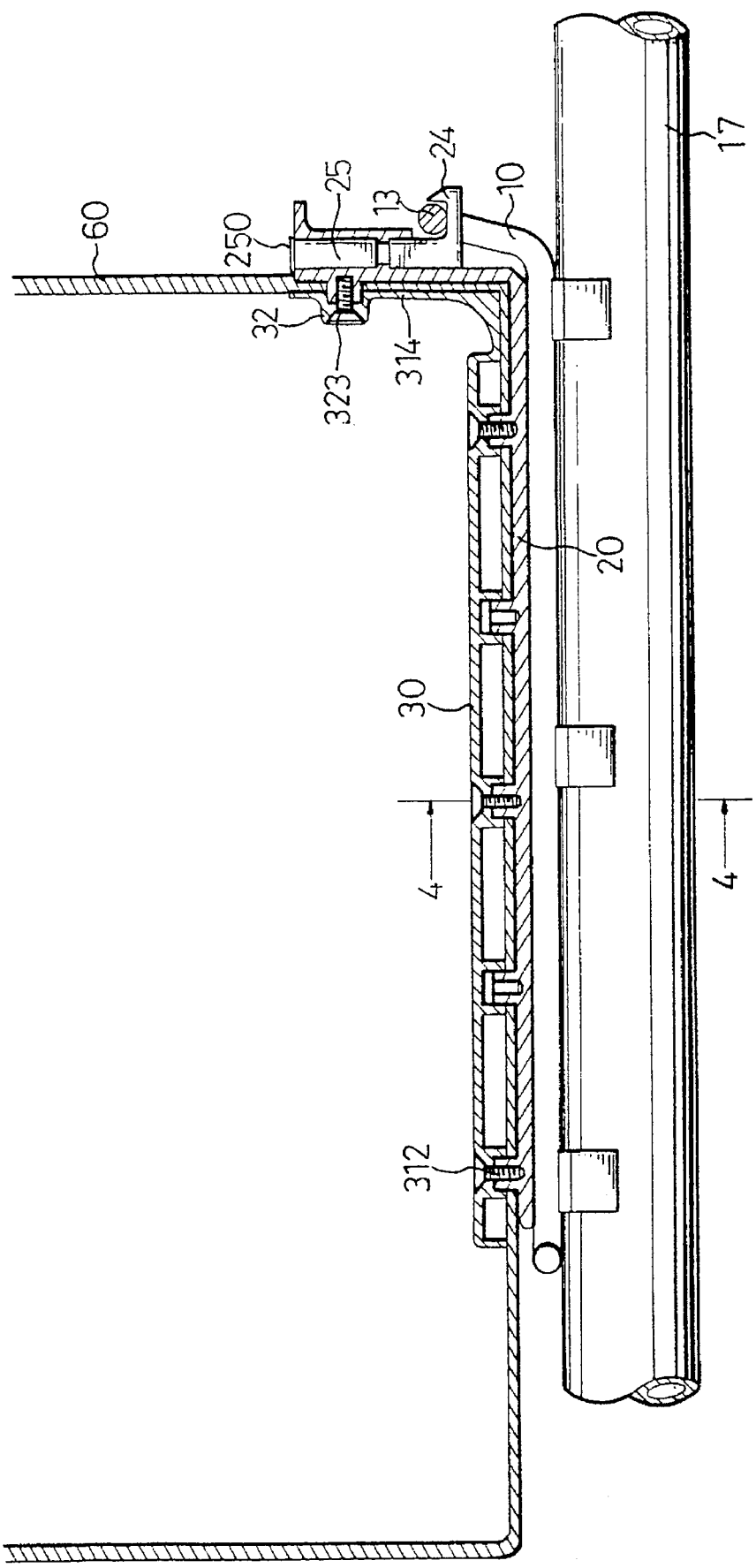
FIG. 3 is a cross sectional view taken along lines 3—3 of FIG. 1.
Figure 4:
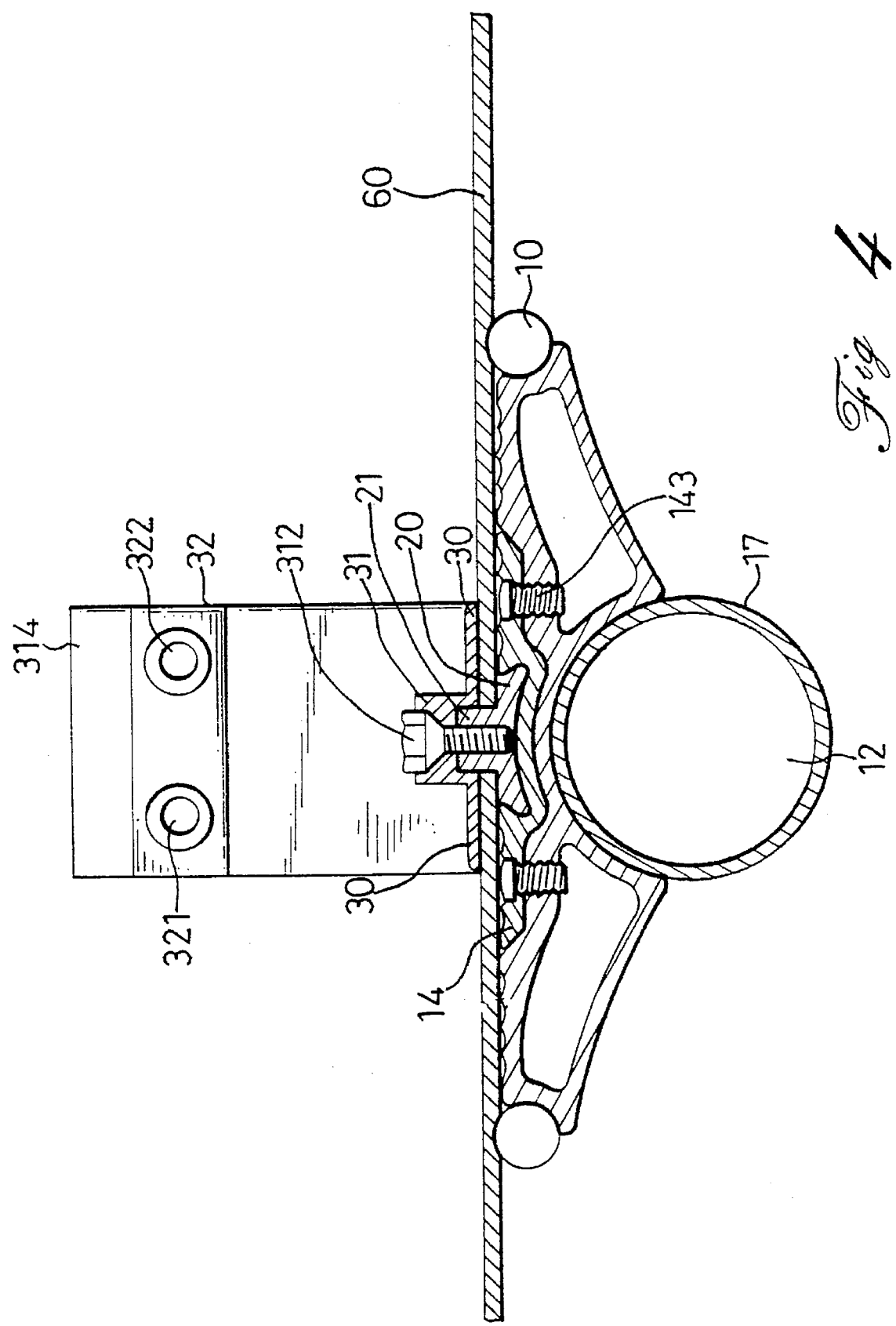
FIG. 4 is a cross sectional view taken along lines 4—4 of FIG. 3.

A beam 20 is engaged with and secured to the bottom of the bag 60 (FIGS. 3 and 4) and includes a dovetail cross section for sliding engagement in the dovetail slot 141 of the platform 14 (FIG. 4). The beam 20 includes a number of studs 21 extended upward therefrom and engaged inward of the bag 60 (FIGS. 3 and 4). The studs 21 each includes a screw hole 211 formed therein. A block 22 is extended upward from the front end of the beam 20 and includes a vertical channel 222 formed therein and includes two studs 223, 224 extended rearward therefrom. The block 22 includes a knob 221 provided on top thereof. A number of reinforcing ribs 23 are provided between the block 22 and the beam 20 for reinforcing the block 22.

A button 25 is slidably engaged in the vertical channel 222 of the block 22 and is guided to move up and down along the vertical channel 222. The button 25 includes a plate 250 provided on top thereof for engaging with the block 22 and for preventing the button 25 to be moved inward of the vertical channel 222. The button 25 includes two cavities 251, 252 formed in the bottom portion and includes a pole 253 extended downward therefrom. A hook 24 includes two protrusions 241, 242 having an upper portion engaged in the cavities 251, 252 of the button 25 respectively. The hook 24 is secured to the button 25 by fastening screw 243 such that the button 25 and the hook 24 move in concert with each other and such that the hook 24 may be moved by the button 25. A spring 26 is engaged on the pole 253 and engaged between the button 25 and the block 22 for biasing the button 25 upward and for allowing the button 25 to be partially extended upward beyond the block 22. The hook 24 may be biased upward to engage with the front rod 13 of the rack body 10 by the spring 26 such that the beam 20 may be secured to the rack body 10, best shown in FIGS. 1 and 3.

A bar 30 is engaged in the bag 60 and is engaged on the beam 20. The bar 30 includes a longitudinal bulge 31 for engaging onto the beam 20 and includes a number of holes 311 for aligning with the studs 21 of the beam 20. A number of fastening screws 312 (FIGS. 3 and 4) are engaged through the holes 311 of the bar 36 and engaged with the screw holes 211 of the beam 20 so as to secure the bar 30 to the beam 20 and so as to secure the beam 20 to the bag 69. The bar 30 includes a board 314 extended upward from the front portion thereof and includes a swelling 32 formed thereon for engaging with the studs 223, 224. The swelling 32 includes two holes 321, 322 for aligning with the studs 223, 224 and for engaging with fastening screws 323 (FIG. 3) which may further secure the bar 30 to the beam 20 and which may further secure the bar 30 and the beam 20 to the bag 60.

Figure 5:
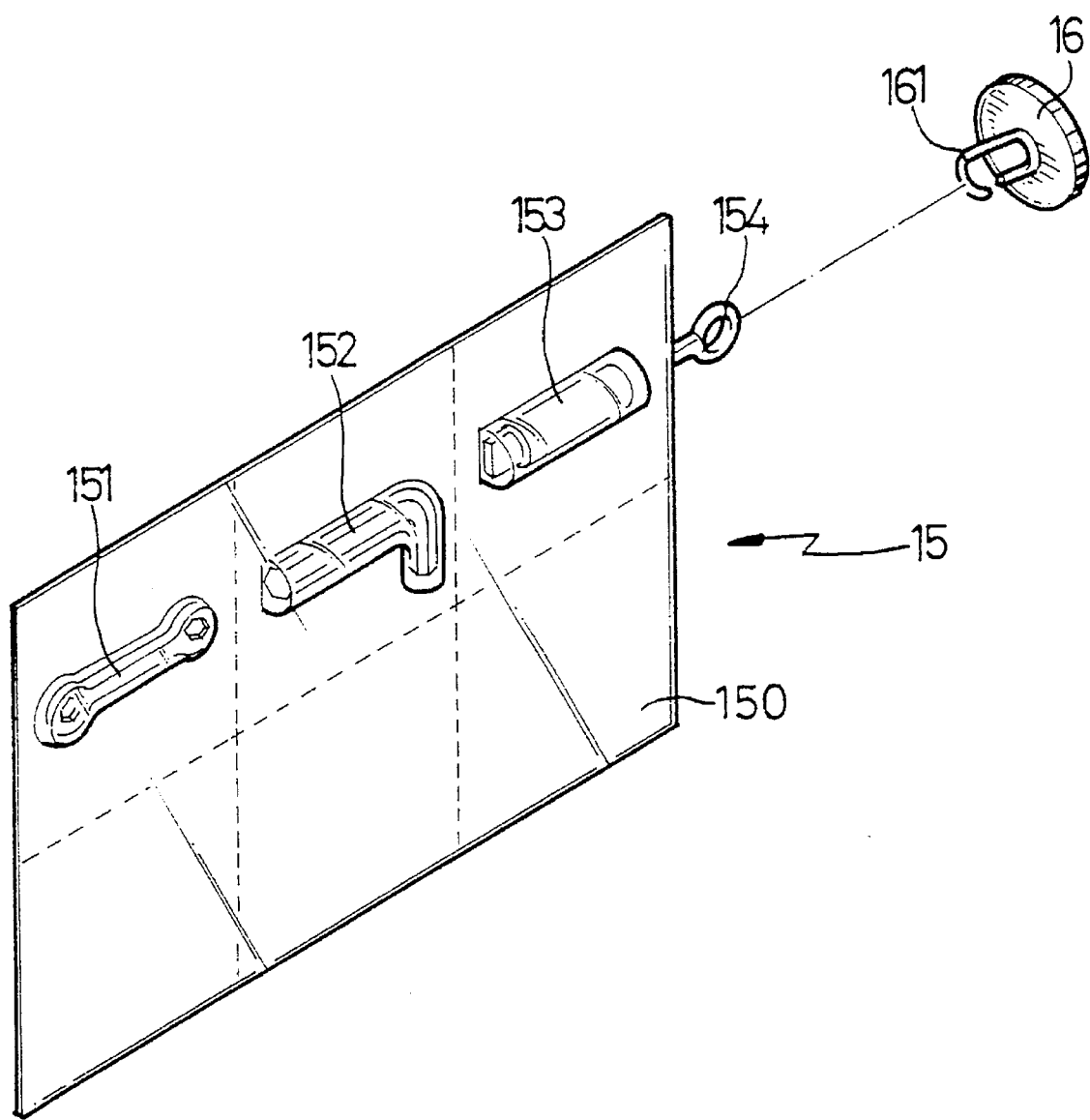
FIG. 5 is a perspective view of a tool assembly.

Referring next to FIG. 5, illustrated is a tool assembly 15 that is to be engaged in and received in the hollow interior 12 of the tube 17. The tool assembly 15 includes a panel 150 having a number of rooms 151, 152, 153 formed therein for receiving various kinds of tools therein which may be wrapped and packaged together by the panel 150 so as to be engaged in the tube 17. The panel 150 includes a ring 154 secured thereto. A lid 16 includes a hook 161 for engaging with the ring 154 and for pulling the tool assembly outward of the tube 17. The lid 16 is to be engaged to the tube 17 for enclosing the outer open end of the tube 17, best shown in FIG. 1.

Figure 6:
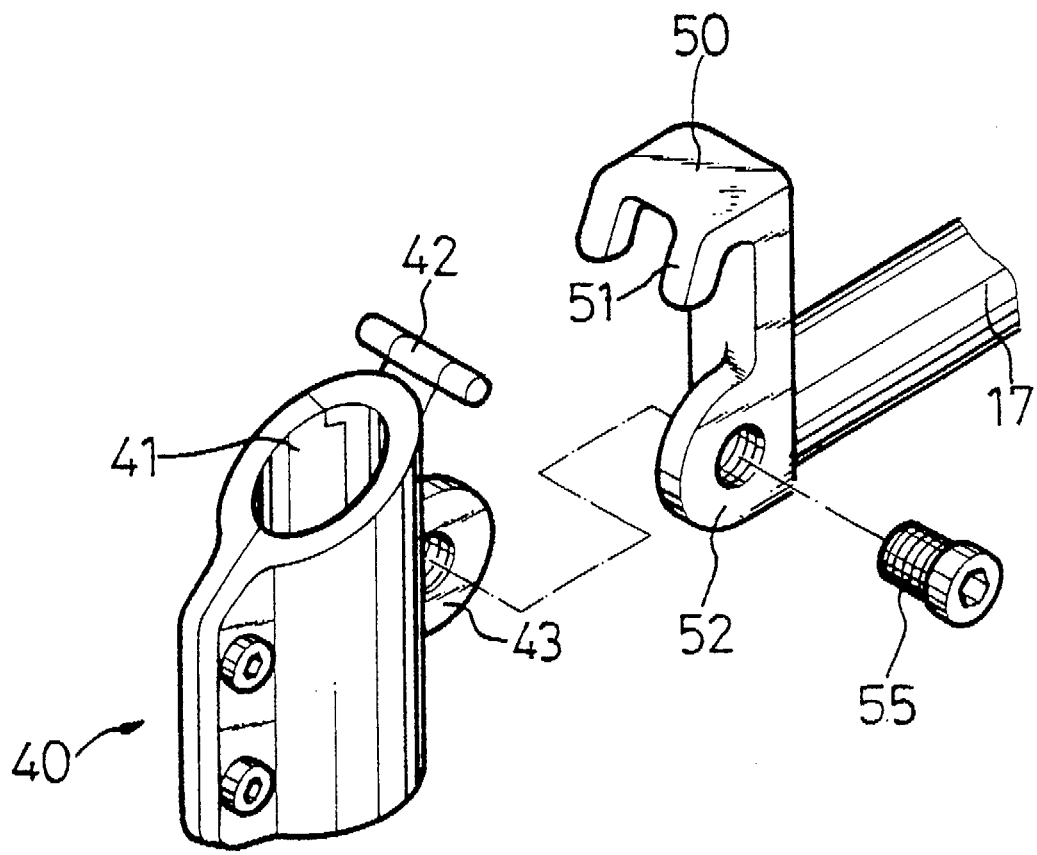
FIG. 6 is a partial exploded view showing a mechanism for attaching the supporting tube to the seat post of the bicycle.

Referring next to FIG. 6, a sleeve 40 may first be secured to the seat post 90 (FIG. 1) of the bicycle and includes a bore 41 for engaging with the seat post 90. The sleeve 40 includes a pin 42 laterally disposed on top thereof and includes an ear 43 extended therefrom. The tube 17 includes a bracket 50 secured to one end thereof and includes a hook 51 for engaging with the lateral pin 42 and includes an ear 52 for aligning with the ear 43 of the sleeve 40. A fastening screw 55 is engaged through the ears 43, 52 so as to secure the bracket 50 to the sleeve 40 and so as to secure the tube 17 to the seat post 90. The tube 17 and thus the article carrier assembly may be attached to any of the typical bicycles.

Accordingly, the article carrier assembly in accordance with the present invention includes a mechanism for allowing the bag or pannier to be easily attached onto the carrier rack.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An article carrier assembly for attaching a bag to a cycle, said article carrier assembly comprising:

a rack body including a front rod and including a dovetail slot formed therein, a beam for securing to the bag, said beam including a dovetail cross section for sliding engagement in said dovetail slot of said rack body, said beam including a front portion having a block extended upward therefrom, said block including a hook provided therein for engaging with said front rod of said rack body so as to be secured to said rack body, a bar for engaging in the bag and for engaging on said beam, and means for securing said beam to said bar and for securing said bar and said beam to the bag.

2. An article carrier assembly according to claim 1, wherein said rack body includes a platform secured on top thereof, said dovetail slot is formed in said platform, said platform includes a wave shaped upper portion for reinforcing purposes.

3. An article carrier assembly according to claim 1, wherein said block includes a vertical channel formed therein, said article carrier assembly further includes a button slidably engaged in said vertical channel, said hook is secured to said button and moved in concert with said button, and means for biasing said button upward and for biasing said hook to engage with said front rod so as to secure said bag to said rack body.

4. An article carrier assembly according to claim 1 further comprising a tube for securing to the cycle, said rack body being secured on said tube, said tube including a hollow interior, and a tool assembly for engaging in said hollow interior of said tube.

5. An article carrier assembly according to claim 1 further comprising a sleeve for securing to the cycle, said sleeve including a lateral pin and including a first ear extended therefrom, a bracket secured to said tube and including a second hook for engaging with said lateral pin and including a second ear for aligning with said first ear of said sleeve, and means for securing said first and said second ears together so as to secure said bracket to said sleeve and so as to secure said tube to said sleeve.

* * * * *